US006978774B2

(12) United States Patent
Fisher et al.

(10) Patent No.: US 6,978,774 B2
(45) Date of Patent: Dec. 27, 2005

(54) EMISSION CONTROL VALVE FOR GAS-FUELED ENGINES

(75) Inventors: C. Ross Fisher, Cardiff, CA (US); David G. Fisher, Carlsbad, CA (US); Kristian W. Yates, Escondido, CA (US); William A. Hoie, San Diego, CA (US)

(73) Assignee: Continental Controls Corporation, San Diego, CA (US)

( * ) Notice: Subject to any disclaimer, the term of this patent is extended or adjusted under 35 U.S.C. 154(b) by 0 days.

(21) Appl. No.: 10/346,228

(22) Filed: Jan. 16, 2003

(65) Prior Publication Data

US 2004/0139951 A1 Jul. 22, 2004

(51) Int. Cl.[7] ............................................... F02D 41/00
(52) U.S. Cl. .................... 123/672; 123/681; 137/487.5
(58) Field of Search ............................... 123/672, 679, 123/681, 683, 527; 137/487.5, 82

(56) References Cited

U.S. PATENT DOCUMENTS

| | | | | |
|---|---|---|---|---|
| 4,263,883 A | | 4/1981 | Treible et al. | |
| 5,105,790 A | | 4/1992 | Nye, Jr. | |
| 5,357,938 A | | 10/1994 | Bedford et al. | |
| 5,692,478 A | * | 12/1997 | Nogi et al. | 123/494 |
| 5,714,683 A | * | 2/1998 | Maloney | 73/118.2 |
| 5,720,266 A | * | 2/1998 | Nogi et al. | 123/680 |
| 6,003,543 A | | 12/1999 | Sulatisky et al. | |
| 6,253,751 B1 | | 7/2001 | Carlsson | |
| 6,354,268 B1 | * | 3/2002 | Beck et al. | 123/435 |
| 6,666,185 B1 | * | 12/2003 | Willi et al. | 123/299 |

OTHER PUBLICATIONS

Altronic, Inc., Air-Fuel Ratio Control for Carbureted Engines EPC-100 Series, Advertising Brochure Apr. 2002.
Miratech Corporation, The MEC-2001, Manuel, pp. 1-2, Publication date unknown.
Dynalco Controls, AF-1400 Series Air Quality Controllers for Carbureted Engines, Description of Operation; one page, Published 1997.
Altronic, Inc., Air-Fuel Ratio Control for Carbureted Engines, AccuNox Series, Advertising Brochure, pp. 1-2, Nov. 1998.

* cited by examiner

*Primary Examiner*—John T. Kwon
(74) *Attorney, Agent, or Firm*—Gordon & Rees LLP

(57) ABSTRACT

An emission control device for use with stationary or mobile gas-fueled internal combustion engines is described, which is placed in the fuel supply line and operates with full fuel authority. An oxygen sensor measures exhaust oxygen content. The valve internally houses a programmable microprocessor, a pressure transducer and a fuel flow conduit throttled by a balanced poppet valve. Signals to the microprocessor from the oxygen sensor, the pressure transducer indicating outflow gas pressure cause the microprocessor to motivate an actuator to move the valve within the gas stream and thus regulate the outlet pressure and also the gas flow rate to maintain a desired air/fuel ratio to the engine and keep exhaust emissions at an optimum level consistent with the engine operating load requirements and characteristics. Finite incremental control of valve position, preferably assisted by an internal position transducer, permits close control of the exhaust emissions.

37 Claims, 2 Drawing Sheets

EMISSION CONTROL VALVE FOR GAS-FUELED ENGINES

BACKGROUND OF THE INVENTION

1. Field of the Invention

The invention relates to emission control valves for gas-fueled engines, both carbureted and fuel injected. More particularly it relates to an emission control valve with direct emissions sensor input having internal control and full fuel authority without supplemental fuel metering or biasing of a pneumatic pressure regulator.

2. Background Information

Emission control devices and methods for use with stationary or mobile engines are numerous and extensively described in prior art patents and literature. Such devices can be separated into two major groups based on their respective fuels. The two groups represent significantly different areas of technology, notwithstanding their common goal, since the structure and operational characteristics of the two types of applications are quite different. One group is those that are fueled with a liquid fuel, such as gasoline or diesel fuel; that group is not involved in the present invention. The other group, to which this invention is directed, is those engines and engine systems, particularly reciprocating engines, that are fueled with gaseous fuels, such as natural gas, butane and propane. (Therefore the use of the word "gas" in the specification and claims herein shall mean gaseous fuel and does not refer to gasoline.)

There have been numerous prior art devices for regulation of gas-fueled engine operation which seek to control emissions at low levels. While some have had varying degrees of success, they have primarily relied on various types of supplemental fuel metering, biasing of a pneumatic pressure regulator, or limited throttling of the main fuel supply and have required substantial amounts of external support equipment and electrical interconnections among such equipment, have suffered from slow response and generally have not been particularly easy, convenient or economical to install, operate or use. Few have had any significant degree of self-containment or full fuel authority.

One system which is currently used in basic or modified form for several commercial products is disclosed in U.S. Pat. No. 5,105,790. In this system for use with turbocharged engines a small fluid bleed unit is used in which there are a pair of restrictive orifices in series with a nozzle. Regulated fluid output pressure measured between the orifices is used to control a pneumatic pressure regulator that in turn operates on an engine fuel line to regulate fuel pressure and enhance engine efficiency. This system and others like it are susceptible to the performance deficiencies of a pneumatic pressure regulator such as droop in the set point due to spring rate and/or hysterisis. This type of system must wait for a subsequent change in the oxygen sensor reading before correcting for such errors, which results in a substantial time lag in engine response to load changes. A second system which is of greater relevance to the present invention is that disclosed in U.S. Pat. No. 6,003,543, which uses a closed loop control on a pressure transducer to maintain the pressure downstream of an electromagnetically actuated poppet valve. In this system, however, finite incremental variable control of flow is not possible; the system can operate only to fully open or fully close the poppet valve. Such operation has limited resolution and turndown ratio and often results in instability in the regulated pressure, as exemplified in the patent in a test of a proportional-integral controller. Such a system is practical only for very low flow regimes where significant pressure fluctuations are acceptable and precise pressure regulation is not necessary.

Earlier engines were designed to run with about 10% excess air. This enabled the engines to accommodate varying loads which caused a variation in fuel mixture without complex fuel controls since there was always sufficient air to burn the amount of fuel reaching the engine. However, such non-stoichiometric engines emitted substantial exhaust pollutants. As catalytic pollution emission systems became required on engines, the engines had to be operated in substantially stoichiometric air/fuel ranges, since the catalysts could not tolerate oxygen contents in the exhaust of more than 2–3%. In practice the stoichiometric engines operating with catalytic converters require a precise fuel mixture that can not be achieved over the power range of no load to full load with a pneumatic pressure regulator and a carburetor. The industry has attempted to compensate by creating fuel control systems such as those mentioned above in an effort to maintain a precise fuel mixture and the resulting low emissions. To date those fuel control systems have been, as noted above, neither simple in structure nor reliable to use, nor effective during transient speed and load changes.

It would therefore be of great interest to have an emission control device for a gas-fueled engine which would be substantially self-contained, would operate with full fuel authority without need for any supplemental fuel metering or additional pressure regulators, would be rapidly responsive, would automatically correct for pressure errors independent of oxygen sensor input, could provide stable operation over a wide range of load fluctuations, and which would be capable of maintaining precise emission control during speed and load transients.

SUMMARY OF THE INVENTION

The invention herein is an emission control valve for use with stationary or mobile gas-fueled internal combustion engines. Emissions are controlled by metering the correct amount of fuel to the engine based on the input from an exhaust emissions or oxygen sensor located in the exhaust stream. The valve meters fuel by operating as a variable pressure regulator and controlling the pressure on the inlet side of the engine's carburetor, venturi, fuel injector etc. The valve is placed in the engine fuel supply line and operates with full fuel authority. The valve internally houses a programmable microprocessor, a pressure transducer, a position transducer and a fuel flow conduit throttled by a balanced poppet valve. Signals to the microprocessor from the oxygen sensor, the pressure transducer indicating outlet gas pressure and the position transducer indicating position of an internal poppet valve cause the microprocessor to motivate an actuator to move the poppet valve within the gas flow stream to vary the gas flow rate so as to maintain a desired air/fuel ratio to the engine and keep exhaust emissions at an optimum level consistent with the engine operating load requirements and characteristics. Finite incremental control of valve position permits close control of the exhaust emissions. This is achieved using a series of closed loop control circuits. The innermost control loop is closed on the poppet valve position, which determines the fuel metering area. The set point for poppet position is determined by a second closed loop control circuit on valve outlet pressure. The poppet position set point is adjusted to maintain the outlet pressure set point. The outermost closed loop control circuit on the oxygen sensor input determines the outlet pressure set point. The oxygen sensor set point is determined from an exhaust gas emissions analysis.

The control valve is substantially self-contained, includes an internal microprocessor, and operates with full fuel authority rather than having to operate with or on limited throttling, supplemental fuel streams, pressure regulator biasing, or other partial or minor gas streams. The valve is placed in the engine fuel supply line and an oxygen sensor is placed in the engine exhaust line, typically ahead of the catalytic converter. Oxygen content of the exhaust is indicative of whether the engine is running at the desired air/fuel ratio and neither rich nor lean. The desired ratio is predetermined to keep exhaust emissions at an optimum level consistent with the engine operating load requirements and characteristics.

The valve contains a microprocessor, a pressure transducer and, preferably, a position transducer internally of the valve housing, and has a fuel flow conduit which runs through the valve body. All gas fuel from the fuel source moving to the engine passes through the fuel flow conduit in the valve. The input signal from the external oxygen sensor indicating oxygen content in the exhaust gas, the signal from the internal pressure transducer indicating outflow or output pressure from the valve of the fuel gas, and the signal from the internal position transducer indicating position of an internal poppet valve are routed to the microprocessor which generates a signal in response which motivates an actuator to move the poppet valve within the gas flow stream in the fuel flow conduit to vary the gas flow rate by imposing greater or lesser restriction on a flow control orifice within the fuel flow conduit. When the received signals indicate that oxygen content has varied from the set point the poppet valve is moved toward a closed position (i.e., more restrictive of flow) if the air/fuel ratio has become too rich, to decrease fuel flow and move toward a leaner air/fuel mixture, or, if the air/fuel ratio has become too lean, the poppet valve will open somewhat (i.e., be less restrictive of flow) to increase fuel flow and move toward richer air/fuel mixture. Thus the valve works automatically to correct any fluctuations in the engine fuel usage to maintain the desired air/fuel ratio and thus also the optimum exhaust emissions level.

The microprocessor enables the valve to maintain substantially continuous emissions compliance regardless of changes in engine load or speed, since it accommodates pressure changes and valve position changes while still controlling on exhaust oxygen content to provide the optimum air/fuel ratio under each operating condition. The response to the changes is rapid and can be accomplished in small incremental steps, thus permitting close control to be maintained. The small increments of change prevent serious fluctuations in the engine's emissions levels, since the valve can react appropriately to changes in operations as they occur. In addition position of the poppet valve is maintained unless there is a change in the position set point, thus dampening undesired response to externally applied disturbances inherent in gas engine systems, such as flow forces, pressure differentials, friction, hysterisis, actuator drift, etc., Such operations are in contrast to many prior art emissions control devices, which are essentially inactive until a sufficiently large change in emissions level has occurred to trigger operation of the devices, which then tend to overcompensate to cut the emissions, or which are unduly responsive to minor flow fluctuations, both of which tend to initiate severe and sometimes quite random cycles of variations in engine operations.

The air/fuel ratio may be either stoichiometric or lean burn, which refers to a very large amount of excess airy. There are known advantages and disadvantages to operation in either regime. Stoichiometric operation, sometimes referred to as rich-burn, used in conjunction with a catalytic converter is required to meet the emissions standards in many locations in the United States. This is the most common application but does not exclude the use of the valve for lean burn applications.

The engine may also include a turbocharger, which may be placed before or after the carburetor. Its placement will determine whether a supplemental reference pressure input will be needed with the valve.

Thus, in a broad embodiment, the invention is described as an apparatus for control of exhaust emissions of a gas fueled internal combustion engine, the engine having an air intake, an intake conduit for gaseous fuel and an exhaust conduit for gaseous combustion products, which apparatus comprises a control device comprising a housing having a fuel flow conduit therethrough, the fuel flow conduit being aligned with the intake conduit when the device is incorporated into the intake conduit with the conduits forming a continuous flow path for all fuel there flowing to the engine, and having disposed within the housing a programmable microprocessor, a gas flow metering valve, a pressure transducer having signal communication with the microprocessor; and an actuator having signal communication with the microprocessor and motivating the gas flow control valve; and a sensor disposed in the exhaust conduit for sensing of a gaseous component of the exhaust and having signal communication with the microprocessor; and an electrical power supply to the microprocessor, pressure transducer and actuator; whereby in response to a signal received from the sensor or from the pressure transducer indicative of engine operating conditions in which an unacceptable level of exhaust emissions exists, the microprocessor controls the actuator to motivate the gas flow metering valve to change outlet pressure and in turn flow rate of the fuel to the engine to create a air/fuel ratio in combustion chambers of the engine in a manner to restore emissions content level in the exhaust gas to an acceptable level of such exhaust emissions.

Optional but preferred in the inventive apparatus is a position transducer having signal communication with the microprocessor for maintaining the gas flow metering valve at a constant position in the absence of motivation of the actuator by the microprocessor. Additionally, a turbocharger may be disposed ahead of the fuel mixing unit in the air intake conduit or between the fuel mixing unit and the cylinders of the engine in a conduit through which the air/fuel mixture is distributed.

The sensor in the exhaust conduit may be responsive to content of oxygen, a carbon oxide, a nitrogen oxide or a hydrocarbon in the exhaust, but preferably it will be responsive to content of oxygen in the exhaust.

Other aspects of the structure and operation of the emission control valve will be described in detail below.

DETAILED DESCRIPTION AND PREFERRED EMBODIMENTS

Figure 1:
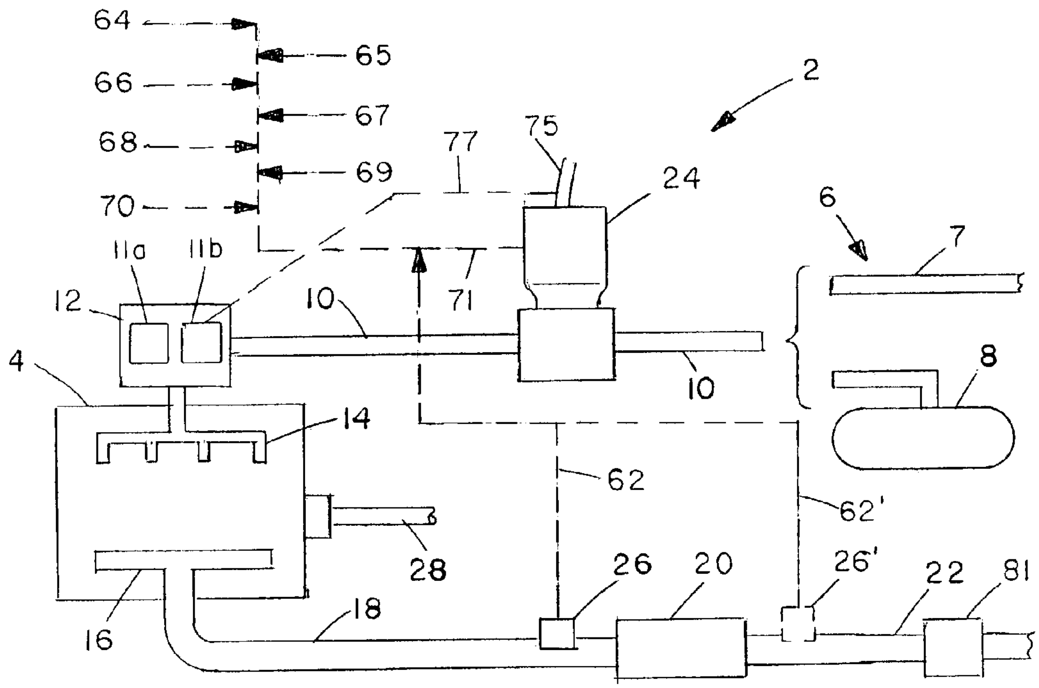
FIG. 1 is a schematic diagram of an engine system with the emission control valve of the present invention incorporated into the fuel supply line.

The invention herein can be best understood by reference to the drawings. FIG. 1 illustrates schematically a gas-fueled engine system 2 in which the emission control valve of the present invention is incorporated. The gaseous fuel used in the engine may be any gaseous fuel including gaseous hydrocarbons and hydrogen, but will commonly be municipal natural gas, landfill gas, butane or propane; such engines typically run on a stoichiometric, air/fuel mixture, but can be used with clean-burn engines (large amount of excess air). The invention is not applicable to liquid fuel engine systems. In the system 2 there is an internal combustion engine 4. The fuel which is obtained from a gas fuel supply source 6 which may be a municipal natural gas supply system or landfill gas 7, a propane or butane supply tank 8, or any other convenient source of gaseous fuel. The gaseous fuel for the engine 4 moves under pressure through fuel supply conduit 10 to the air/fuel mixing system 12, which is shown schematically. The system 12 will have a carburetor, fuel injectors or mixing bowl, or other equivalent device (11*a*) with an associated air supply. For a carburetor or mixing bowl 11*a*, air will be mixed with the fuel in the device and the mixture distributed to the cylinders as schematically indicated at 14, usually by means of an intake manifold. For a fuel injector system 11*a*, the fuel is injected directly into the engine cylinders or intake manifold runners where it mixes with the intake air. The system may also include a turbocharger 11*b* placed in the air supply line ahead of the mixing device 11*a* or, in other applications the turbocharger may be installed following the fuel metering device 11*a* and ahead of the cylinders. Following combustion of the fuel in the engine 4 the combustion products are vented from the cylinders through exhaust manifold 16 into exhaust conduit 18, passing through catalytic converter 20 and exhausting to the atmosphere or other environment at 22. The power output of the engine 4 when running is provided through operation of drive shaft 28 which may be connected to any desired engine-operated device directly or through a transmission unit.

The engines 4 of interest in this invention may be stationary or mobile, but most commonly will be stationary. Typical examples are stand-by or emergency power generation units where the engine drives an electrical generator, cogeneration units for heat generation, and stationary industrial engines. The most common fuel supplies are municipal natural gas or landfill gas, with propane or butane commonly used in locations where distributed natural gas supply systems are not readily or conveniently available. Thus far the system as described is conventional.

The present invention is an emissions control valve 24 which is incorporated into the fuel supply conduit 10 in a manner such that all of the gaseous fuel passes through the valve 24 as it moves from the source 6 to the engine 4; i.e., the valve thus has full fuel authority. Operation of valve 24 provides optimum control of air/fuel ratios, such that toxic exhaust emissions are maintained at very low levels, at or more usually well below government-mandated emission control standards. Associated with valve 24 and cooperating therewith in a manner to be described below is sensor 26 which will be disposed in exhaust conduit 18 either between the exhaust manifold 16 and the catalytic converter 20 or following the catalytic converter 20 (as indicated at 26') and which generates a signal 62 or 62' to internal microprocessor 31. Sensor 26/26' is preferably an oxygen sensor, and more preferably will be a zirconium oxide oxygen sensor. The position of the sensor at 26 or 26' will be determined by the type of sensor used and the exhaust component to be sensed, since the exhaust composition of hydrocarbons, $CO_x$, $NO_x$, $H_2O$ and $O_2$ is significantly different from the exhaust composition following its passage through the catalytic converter 20. Normally if the sensor is an oxygen sensor, it will be ahead of the catalytic converter 20 at 26, and if it is a sensor for nitrogen or carbon oxides or hydrocarbons it will commonly be placed behind the catalytic converter 20 at 26'. The operating regime of the engine is also a determining factor for the type of oxygen sensor, since oxygen contents in stoichiometric and non-stoichiometric systems are different because of the excess air in the latter. If sensors (analyzers) are used for other common exhaust components such as $NO_x$, $CO_x$ or hydrocarbons their nature also will be a function of the engine operating regime and the sensor placement. The various sensors may have different correlations with the air/fuel ratio being controlled by the valve, but the valve's operating software can include or accommodate implementation of such correlations other than the preferred oxygen correlation. The sensor may be heated or non-heated. The preferred oxygen sensor does not need a power source; heat from the exhaust and contact with the oxygen in the exhaust gas generates the signal 62 which indicates the oxygen content. One may also include the ability to detect a faulty oxygen sensor 26/26' or alternative sensor by impedance measurement and correlation of the signal from the sensor in a manner well known in the art.

Figure 3:
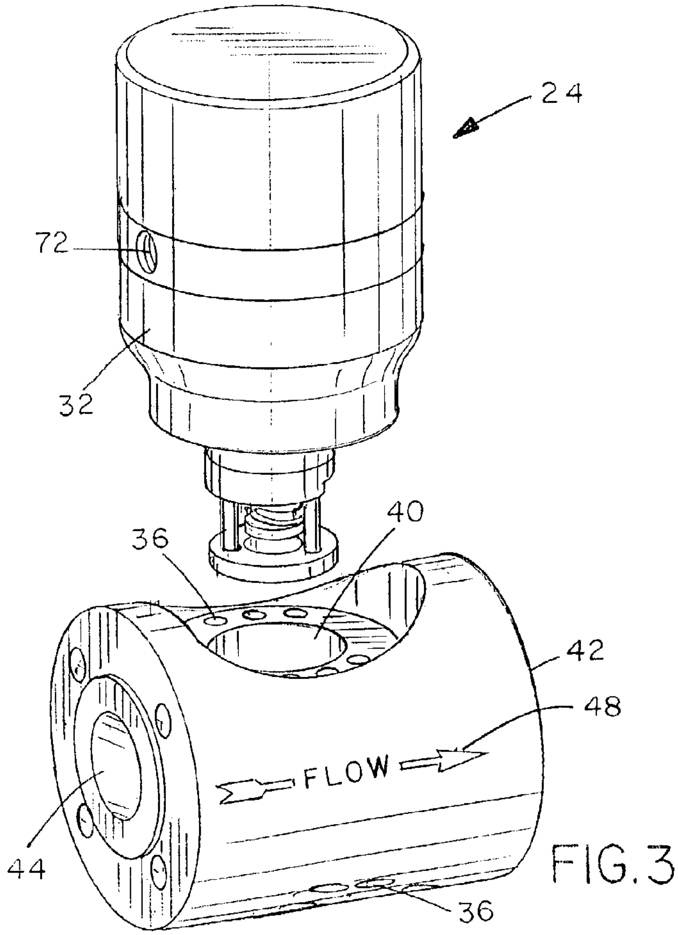
FIG. 3 is an exploded isometric view of the valve illustrating the two principal portions and their method of assembly.
Figure 2:
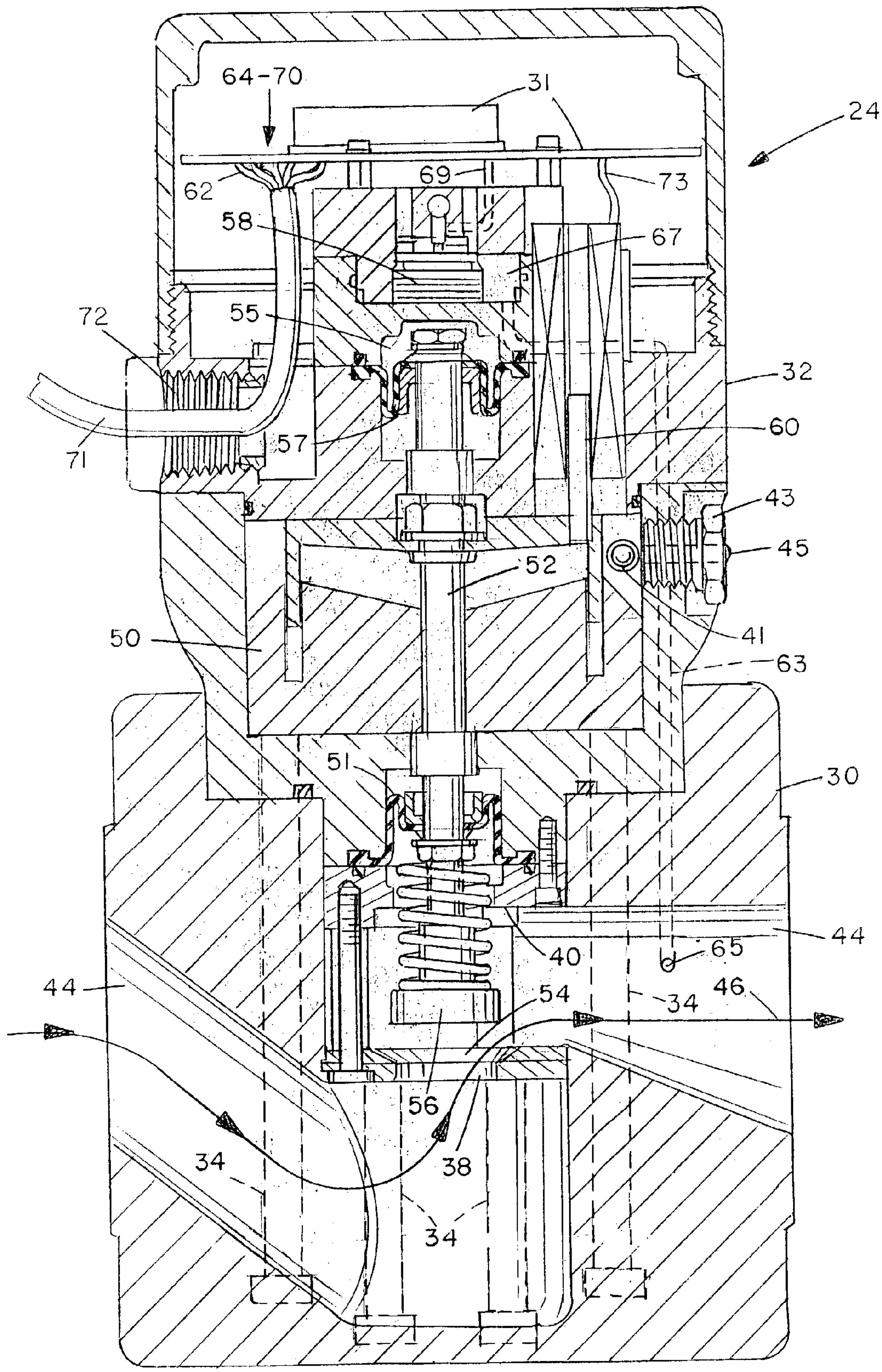
FIG. 2 is a cross-sectional elevation view of the valve of the present invention taken on a vertical midplane through the fuel flow conduit.

The structure and operation of valve 24 are illustrated in detail in FIGS. 2 and 3. The valve can be considered to be made up of two assemblies: a fuel conduit assembly 30 and a metering assembly 32, the two being secured together by bolts 34 passing through bolt holes 36 in assembly 30 into aligned threaded sockets (not shown) in assembly 32, such that a portion of the metering assembly 32 protrudes through opening 40 into the fuel conduit assembly 30. The fuel conduit assembly 30 is essentially a solid block housing 42, conveniently cylindrical in shape, through which passes fuel conduit 44 with the path of fuel flow being indicated by the arrow 46. Indicia 48 is normally applied to the outside of the fuel conduit assembly to provide assistance to users of the valve for correct incorporation of the valves into their engine systems.

Figure 4:
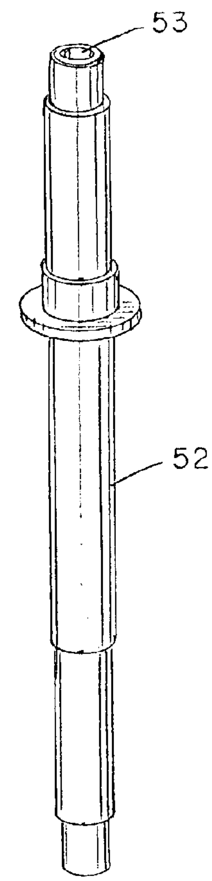
FIG. 4 is a isometric view of a poppet valve shaft of the present invention.

Within the metering assembly 32 is an actuator 50 which drives poppet valve shaft 52 toward or away from valve seat 54 surrounding flow opening 38 in fuel conduit 44 such that poppet 56 can control the flow of fuel through conduit 44 from complete cessation of flow by having poppet 56 fully seated in valve seat 54 to varying volumetric rates of flow directly related to the separation distance between poppet 56 and valve seat 54. As will be discussed below, the present valve 24 provides rapid and precise control of fuel flow rates by the movement of shaft 52 and poppet 56, which is a unique and important function of the invention. The poppet valve is a balanced poppet valve, in that all gas pressure forces are counterbalanced. The valve stem 52 is hollow, as shown at 53 in FIG. 4, which allows gas in flow conduit 44 also to pass at the same pressure into balancing chamber 55. Rolling diaphragms 51 and 57 at opposite ends of the valve stem 52 prevent gas leakage around the stem and have effective pressure areas equivalent to the poppet valve, thus eliminating differential gas pressure forces on the poppet and allowing the actuator and return spring to be the primary forces driving the poppet. (In the described preferred embodiment the actuator is electromagnetically operated. It will be evident to those skilled in the art that other actuator systems could be used such as stepping motors or hydraulic or pneumatic actuators, with corresponding evident modifications of the apparatus.)

The movement of shaft 52 and poppet 56 is controlled by the circuitry of microprocessor 31 which receives signals from pressure transducer 58 and position transducer 60 in conjunction with signals 62/62' from oxygen sensor 26/26'. The signals 62 from oxygen sensor 26 are as noted above responsive to the oxygen content of the exhaust gases from engine 4. Signals from the transducers 58 and 60 will be described below. Other signals or power transmissions to or from the valve 24 also indicated in FIG. 1 are operating power 64 at 24VDC, oxygen sensor set point trim signal 66 having a preferred range of 4–20 mA, an enabling signal 68, an emergency shutdown signal 65, a poppet position feedback signal 67, an outlet pressure feedback signal 69, and provision 70 for receipt of an RS232 serial signal port for the microprocessor 31. Wires for transmission of these signals 62 and 64–70 to the microprocessor 31 are cabled at 71 and passed into the metering assembly 32 through conduit entry port 72 as illustrated in FIG. 2.

Microprocessor 31 can be connected through a serial communications port 70 to an external computer which can be equipped with cooperative software to enable the operator to preset the desired optimum performance parameters for the valve, such as desired oxygen sensor set point, outlet pressure set point for startup, PID control loop gains, cooperation with an exhaust analyzer 81 disposed following the catalytic converter, and the like. The operation of the valve is essentially by incremental self-adjustments based on deviations by the engine system from these manually pre-set or dynamically controlled optimum parameters. One can also incorporate other operating parameters if desired if they are capable of being effectuated by appropriate modifications in the circuitry of microprocessor 31 and the mechanical elements of the valve. It is also contemplated that in addition to providing preset information to microprocessor 31, the external computer could through use of the connection between them handle one or more of the processing tasks which would otherwise be done by the microprocessor 31. It is not preferred that the microprocessor 31 be eliminated and all processing be done by an external computer, but in different operational or system contexts it could be advantageous to have the processing tasks divided between the internal microprocessor 31 and the external computer.

In operation gaseous fuel flows through flow path 44 with the flow rate being under the control of the valve 24 to provide an optimum air/fuel ratio in the engine cylinders for the desired exhaust emission level. Such desired level is normally that which provides minimum emissions consistent with current power output of the engine. As on-going engine operation results in changes in air/fuel ratios provided to the cylinders, such changes will be reflected in changes in the oxygen content of the exhaust gases. The signal being continually sent from oxygen sensor 26 will likewise change in relation to the changes in the oxygen content of the exhaust, and the change of signal will be recognized by microprocessor 31, which will respond by causing actuator 50 to move valve shaft 52 and poppet 56 in a direction to increase or decrease the fuel flow restriction of poppet 56 in opening 38 such that the fuel flow rate through opening 38 and conduit 44 is increased or decreased to the degree necessary to return the air/fuel ratio to the engine 4 to the optimum level under the specific engine load conditions. Thus if the exhaust oxygen content has been reduced by the air/fuel ratio becoming too rich, the poppet 56 will be moved closer to opening 38 to decrease fuel flow and move toward a leaner air/fuel mixture. Conversely, if the exhaust oxygen content has been increased by the air/fuel ratio becoming too lean, the poppet 56 will be moved away from opening 38 to increase fuel flow and move toward a richer air/fuel mixture.

Pressure transducer 58 is responsive to the outlet pressure of the gas fuel after passing through opening 38, and senses the gas pressure through gas sampler conduit 63 which opens into the gas outlet portion of flow conduit 44 at port 65 and passes through the valve body to the transducer chamber 67. The signal 69 from pressure transducer 58 is transmitted to microprocessor 31, which responds accordingly to both signal 69 and signal 62 to motivated actuator 50 to keep the poppet 56 at the proper distance from the opening 38 such that fuel flow rate and exhaust oxygen content are optimized. The pressure transducer 58 will maintain a preset pressure during starting until either the enable input signal 68 goes high, indicating that the oxygen sensor has reached its proper operating temperature or the oxygen sensor signal reaches a pre-determined impedance level at which time the oxygen sensor control loop takes over and adjusts the outlet pressure set point in order to maintain the required air/fuel ratio and emissions levels.

In all cases there is a delay in the response of the oxygen sensor due to the transit time required for a change in the fuel mixture to travel through the intake manifold and combust in the engine and then exhaust through a pipe to the oxygen sensor. This transport delay, is a dead time and a lag in the feedback of a control loop and necessitates the control loop to operate with a very low gain to maintain stable operation. The control is affected by the dead time and then by the fact that the gain is very low, resulting in a control action that makes no correction during the dead time and then the response of the control is very slow because the gain of the control loop is low. Engines controlled with a pneumatic pressure regulator and a carburetor corrected by a supplemental fuel flow or biasing the pressure regulator based on the oxygen sensor input, go out of compliance with the environmental regulations during a load transient, and require many minutes to recover.

This invention provides for the use of an engine load signal, such as a wattmeter, or any parameter proportional to the engine air flow. The internal computer records the gas injection pressure required for the engine to run at the correct fuel mixture, based on the output of the oxygen sensor for each value of the load signal. This table of values is used as the setpoint for the pressure control loop that controls the injection pressure to the carburetor. The computer is continuously monitoring the load signal, gas injection pressure and the voltage from the oxygen sensor. When the engine has been running continuously for a period of time at a constant load and the voltage from the oxygen sensor has stabilized, the value is recorded or updated in the memory of the computer. The system learns what pressure corresponds to each value of the load signal and is constantly updating the pressure values in memory. When a load transient occurs, the load signal changes and the fuel injection pressure makes a corresponding change to the correct new pressure. If the new pressure is off slightly, the oxygen sensor will indicate a small error in fuel-air ratio, the pressure setpoint will be corrected. This feature makes it possible to avoid the problem of the delay in the oxygen sensor signal and makes it possible for the engine to operate at the optimum air-fuel ratio during and following, a load transient. This keeps the engine exhaust in compliance continuously and results in a reduction of the polluting emissions. In addition, since the control gain of the pressure loop is higher, the invention will maintain the manifold pressure more precisely.

In this invention the outlet pressure control loop automatically adjusts the poppet position in order that injection pressure will match the pressure set point. The oxygen sensor set point trim signal 66 is used to trim the oxygen sensor set point during engine operation using an external input such as a display unit or a programmable logic controller. The ability of the programming of the pressure transducer to substantially anticipate the change in the oxygen sensor input and the actuate the poppet independently of and prior to the actual change in the oxygen sensor input, and maintain the outlet pressure set point, permits the valve to react very quickly to load transients in the engine operation, since the pressure transducer can respond to pressure fluctuations directly and not have to wait for changes in the oxygen content of the exhaust to be manifested, observed by the oxygen sensor 26, and transmitted to the microprocessor 31. Thus the negative effects of oxygen sensor lag which are experienced by prior art control devices and methods, are not significantly experienced with the device of this invention.

The optional but preferred position sensor 60 functions primarily as a stabilizer to reduce or prevent undesired movement of the poppet 56 which would vary fuel flow through the valve. The signal 73 from the position transducer 60 is used by the microprocessor 31 to maintain the actuator 50 and poppet valve stem 52 in a constant position, thereby maintaining a stable fuel flow, unless a signal 62 indicating a change in exhaust oxygen content and/or a signal 69 indicating a change in outlet pressure is received. This constant positioning function allows the valve to maintain a stable operation and prevents unwanted valve responses to externally applied disturbances such as flow forces, pressure differentials, friction, hysterisis, actuator drift, etc.

In situations of fuel supply pressure changes and/or engine load changes, the valve has the ability to make responses very rapidly to change fuel flow rate and thereby maintain correct air/fuel ratios to the engine. Under most operating situations, the present valve can move between fully open and fully closed in less than 40 milliseconds, thus making it possible to change the fuel flow rate and pressure almost instantaneously. This is in sharp contrast with prior art methods and devices which mainly use pneumatic interfaces with a pneumatic pressure regulator, which can only accomplish fuel flow rate and pressure changes at much slower rates. Further, since the current device eliminates any substantial amount of lag in the system, the loop gain can be higher and will control the valve outlet pressure with higher precision and maintain the mixture at the optimum point of the catalytic converter with very little deviation. This means that with the use of an exhaust analyzer after the catalyst, the mixture can be fine tuned to provide a balance between the carbon monoxide (CO), the nitrogen oxide ($NO_x$), and the hydrocarbon (HC) emissions. Since the optimum air fuel ratio is maintained during transients and steady state operation, the emissions levels are lower than those of prior art systems and well below current air quality standards.

The valve operates as a variable "zero pressure regulator" using closed loop control on a very low range pressure transducer (pressure sensor)used to measure the discharge pressure of the valve. A 4–20 mA output signal is provided for user diagnostics and is typically calibrated for a pressure of two inches of water per milliamp output above 4 mA, producing a linear pressure output from –8 to 24 inches of water. The valve discharge pressure is sensed at 65 and compared to the pressure set point. The valve position is continually adjusted in order to match the discharge pressure to the set point. The set point typically is adjusted by the microprocessor in order to maintain a discharge pressure that will provide the flow required to match the oxygen sensor set point. This variable pressure set point may be overridden with a default pressure set point when closed loop control using the oxygen sensor is not desirable. Examples of such situations would be during engine startup when the oxygen sensor is cold and inoperable, or in the case of a faulty oxygen sensor. The sensor enable signal allows the user to select between closed loop pressure control using the dynamic pressure sensor set point and closed loop pressure control using the default pressure set point. When the load or air flow increases, the fuel injection pressure follows in less than 0.1 second. The oxygen sensor only needs to make a minor correction, if any, to bring the control back to the desired operating point, thus providing uniquely good transient performance.

Where the inlet air pressure to the fuel mixing device 12 is atmospheric, such as a naturally aspirated engine, the valve works with atmospheric pressure for its reference, and does not require a connection to the reference pressure input 75. When a turbocharger **11*b* is used ahead of the mixing device 11*a*, air inlet pressure of the mixing device is used as a reference pressure for the valve and must be connected to the reference pressure input 75. Positioning of a turbocharger 11*b* after the mixing device 11*a* does not require the external pressure reference 75 since its operation does not affect the atmospheric inlet pressure of the device 12**.

There are other parameters which can be measured and whose values can be used to further trim the valve outlet pressure and enhance the ability to maintain the desired air/fuel ratio to the engine. Use of these inputs (which are in addition to and not in place of the exhaust gas sensor 26/26') will also enhance the stability of the engine operation since fluctuation in one parameter value will be moderated by the stability of the other input values. Correlations for the various parameters can readily be determined and programmed into microprocessor 31. Oxygen value and the other parameters can also be weighted, so that those parameters which have the greatest effect on the control of the air/fuel ratio can be recognized by the microprocessor as the most significant. The parameters may include not only values which are expected to vary during engine operation but also those which will normally be constant during an engine run but which may be changed between runs. An example of the latter would be fuel heating value, where each specific fuel has its own constant heating value but the fuel provided to the engine can vary from one run or run series to a different run or run series. Typical of the various properties of the engine, fuel, or air properties which may be measured and correlated into the valve control system include, but are not limited to, load signal input for oxygen sensor set point correction, air/fuel ratio, manifold pressure, engine speed, fuel heating value and gas composition. These may be used separately or in any desired combination. Other significant engine, fuel and air properties which could be included will be readily recognized by those skilled in the art.

The valve may be easily installed in any engine fuel and exhaust system. It operates from the 24 VDC power source 64 and usually operates with a maximum peak current of 5 A and a maximum average current of 2–3 A. The programmable nature of the microprocessor 31 in the device allows for variable control logic such as start pressure set point, oxygen sensor failure alarm, warm up timer and the like. All features combined result in consistent air/fuel ratios, improved control and engine operational stability, improved fuel economy and reduced emissions. The valve can readily handle gas flow rates of 5–300 scfm (standard cubic feet per minute) and maintain regulated pressures of −8 to 24 inches of water with a tolerance of as little as 0.1 inches of water (0.007 in. Hg).

A small light-emitting diode 41 is conveniently located within the valve 24 at a location where it can be viewed from outside the valve. In the embodiment shown in FIG. 2, the LED 41 is located just inside plug 43, which has a sight glass 45 extending through it, through which the LED can be seen from outside the valve housing. The LED 41 is connected to microprocessor 31 and desirably lights to indicate that all systems in the valve are operating properly. Various light sequences may also be used to indicate error codes for troubleshooting. The LED and sight glass also allows the user to visually confirm the position and/or movement of the actuator.

It will be evident that there are numerous embodiments of the present invention which are not expressly described above but which are clearly within the scope and spirit of the present invention. Therefore, the above description is intended to be exemplary only, and the actual scope of the invention is to be determined from the appended claims.

We claim:

1. Apparatus for control of exhaust emissions of a gas fueled internal combustion engine, said engine having an air intake, an intake conduit for gaseous fuel and an exhaust conduit for gaseous combustion products, which apparatus comprises:

a control device comprising a housing having a fuel flow conduit therethrough, said fuel flow conduit being aligned with said intake conduit when said device is incorporated into said intake conduit with said conduits forming a continuous flow path for all fuel flowing to said engine and having disposed within said housing a programmable microprocessor;

a gas flow metering valve;

a pressure sensor having electrical signal communication with said microprocessor; and an actuator having electrical signal communication with said microprocessor and directly motivating said gas flow control valve; and a sensor disposed in said exhaust conduit for sensing of a gaseous component of said exhaust and having signal communication with said microprocessor; and an electrical power supply to said microprocessor, pressure transducer and actuator;

whereby in response to a signal received from said sensor or from said pressure sensor indicative of engine operating conditions in which an unacceptable level of exhaust emissions exists, said microprocessor controls said actuator to incrementally motivate said gas flow metering valve to change outlet pressure and in turn flow rate of said fuel to said engine to create a air/fuel ratio in combustion chambers of said engine in a manner to restore emissions content level in said exhaust gas to an acceptable level of such exhaust emissions.

2. Apparatus as in claim 1 further comprising a position transducer in said housing having signal communication with said microprocessor for maintaining said gas flow metering valve at a constant position in the absence of motivation of said actuator by said microprocessor.

3. Apparatus as in claim 1 further comprising said fuel flow conduit having a fuel flow orifice disposed therein and said gas flow metering valve controls flow rate of said fuel to said engine by full or partial restriction of fuel flow through said orifice.

4. Apparatus as in claim 3 wherein flow rate control is determined by incremental movement of said gas flow metering valve to produce different degrees of blockage of said orifice by said gas flow metering valve in order to control the valve outlet pressure and in turn alter fuel flow.

5. Apparatus as in claim 1 wherein air and fuel are provided to said engine and said fuel is controlled by said device to maintain a stoichiometric air/fuel mixture at the outlet of a fuel mixing unit from which said mixture is distributed to cylinders of said engine.

6. Apparatus as in claim 5 wherein said fuel mixing unit comprises a carburetor or a fuel injection system.

7. Apparatus as in claim 5 further comprising a turbocharger disposed ahead of said fuel mixing unit in said air intake conduit or between said fuel mixing unit and said cylinders of said engine in a conduit through which said air/fuel mixture is distributed.

8. Apparatus as in claim 7 wherein said turbocharger is disposed ahead of said fuel mixing unit in said air intake conduit and said apparatus further comprises an external reference source of air intake pressure in fluid communication with said pressure transducer to correlate with increased air pressure at the inlet of said fuel mixing unit produced by said turbocharger.

9. Apparatus as in claim 1 wherein air and fuel are provided to said engine and said fuel is controlled by said device to maintain a non-stoichiometric air/fuel mixture at the outlet of a fuel mixing unit from which said mixture is distributed to cylinders of said engine.

10. Apparatus as in claim 9 wherein said fuel mixing unit comprises a carburetor or a fuel injection system.

11. Apparatus as in claim 9 further comprising a turbocharger disposed ahead of said fuel mixing unit in said air intake conduit or between said fuel mixing unit and said cylinders of said engine in a conduit through which said air/fuel mixture is distributed.

12. Apparatus as in claim 11 wherein said turbocharger is disposed ahead of said fuel mixing unit in said air intake conduit and said apparatus further comprises an external reference source of air intake pressure in fluid communication with said pressure transducer to correlate with increased air pressure at the inlet of said fuel mixing unit produced by said turbocharger.

13. Apparatus for control of exhaust emissions of a gas fueled internal combustion engine, said engine having an air intake, an intake conduit for gaseous fuel and an exhaust conduit for gaseous combustion products, which apparatus comprises:

a housing having a fuel flow conduit therethrough, said fuel flow conduit being aligned with said intake conduit when said device is incorporated into said intake conduit with said conduits forming a continuous flow path for all fuel flowing to said engine;

a programmable microprocessor disposed within said housing;

a gas flow metering valve in said housing for incrementally controlling the size of a fuel flow orifice in said fuel flow conduit;

a pressure sensor in said housing having electrical signal communication with said microprocessor, said microprocessor being programmed with a desired set point for said pressure sensor signal;

an actuator in said housing having electrical signal communication with said microprocessor and directly controlling incremental movement of said gas flow control valve;

an exhaust sensor disposed in said exhaust conduit for sensing of a gaseous component of said exhaust and having signal communication with said microprocessor; and an electrical power supply to said microprocessor, pressure transducer and actuator;

whereby in response to a signal received from said sensor or from said pressure sensor indicative of engine operating conditions in which an unacceptable level of exhaust emissions exists, said microprocessor controls said actuator to incrementally motivate said gas flow metering valve to change outlet pressure and in turn flow rate of said fuel to said engine to create a air/fuel ratio in combustion chambers of said engine in a manner to restore emissions content level in said exhaust gas to an acceptable level of such exhaust emissions; and said set point for said pressure sensor being adjusted by said microprocessor based on an external signal to said microprocessor in anticipation of a change in said exhaust sensor input, said microprocessor in response to said external signal motivating said gas flow metering valve for principal adjustment of said gas flow metering valve of said fuel flow rate and subsequently in response to said signal from said exhaust sensor motivating said gas flow metering valve for remaining adjustment of said gas flow metering valve of said fuel flow rate.

14. Apparatus as in claim 13 wherein said external signal received by said microprocessor is indicative of load on said engine.

15. Apparatus as in claim 13 wherein said microprocessor is self programmed with a correlation between corresponding signal values of said pressure sensor and of said external signal such that response of said microprocessor to said external signal substantially anticipates response of said microprocessor to said signal from said exhaust sensor.

16. Apparatus as in claim 13 wherein said signal received by said microprocessor from said pressure sensor is indicative of deviation of value of outflow pressure of said fuel within said fuel flow conduit downstream of said fuel flow orifice from said desired set point value of said outflow pressure.

17. Apparatus as in claim 13 wherein said signal received by said microprocessor from said sensor in said exhaust conduit is indicative of deviation of value of said air/fuel ratio of fuel and air to said engine from a desired reference value for said air/fuel ratio.

18. Apparatus as in claim 1 wherein said sensor in said exhaust conduit is responsive to content of oxygen, a carbon oxide, a nitrogen oxide or a hydrocarbon in said exhaust.

19. Apparatus as in claim 18 wherein said sensor in said exhaust conduit is responsive to content of oxygen in said exhaust.

20. Apparatus as in claim 1 wherein said exhaust conduit contains a catalytic converter and said sensor is disposed ahead of said catalytic converter in said exhaust conduit.

21. Apparatus as in claim 1 wherein said exhaust conduit contains a catalytic converter and said sensor is disposed following said catalytic converter in said exhaust conduit.

22. Apparatus as in claim 1 further comprising a signal input port for transmission to said programmable microprocessor of a programming signal generated externally of said housing in addition to said exhaust sensor signal.

23. Apparatus as in claim 22 wherein said programming signal is generated by a computer.

24. Apparatus as in claim 23 wherein said programming signal comprises a signal setting a desired reference value for content of oxygen, a carbon oxide, a nitrogen oxide or a hydrocarbon in said gaseous combustion products in said exhaust conduit, a signal setting a desired reference value for air/fuel ratio of fuel and air to said engine or a signal setting a desired reference value of outflow pressure of said fuel within said fuel flow conduit downstream of a fuel flow orifice disposed therein.

25. Apparatus as in claim 24 wherein said content is content of oxygen.

26. Apparatus as in claim 24 wherein said signal received by said microprocessor from said sensor is indicative of deviation of content value of said oxygen, a carbon oxide, a nitrogen oxide or a hydrocarbon from a respective desired reference value for said oxygen, carbon oxide, nitrogen oxide or hydrocarbon.

27. Apparatus as in claim 26 wherein said content is content of oxygen.

28. Apparatus as in claim 1 wherein said gas flow metering valve comprises a balanced poppet valve.

29. Apparatus as in claim 1 wherein said fuel whose flow rate in said fuel flow conduit in controlled comprises a gaseous hydrocarbon.

30. Apparatus as in claim 29 wherein said fuel whose flow rate in said fuel flow conduit is controlled comprises natural gas, propane or butane.

31. Apparatus as in claim 1 wherein said housing comprises an upper part and a lower part releasably secured to said upper part, the fuel flow conduit being located in said lower part of said housing which is separable from the remainder of said housing and said microprocessor, metering valve, pressure sensor, and actuator being mounted in said upper part of said housing, said upper and lower parts having a communicating passageway and said metering valve extending through said passageway into said fuel flow conduit to control outlet pressure.

32. Apparatus as in claim 1 wherein said engine comprises a stationary or mobile engine.

33. Apparatus as in claim 32 wherein said engine comprises a stationary engine.

34. Apparatus as in claim 1 further comprising an exhaust analyzer in said exhaust conduit.

35. Apparatus as in claim 34 further comprising cooperation of said microprocessor with said exhaust analyzer to permit said microprocessor to further control said actuator with respect to positioning of said valve for control of said fuel flow rate.

36. Apparatus as in claim 1 further comprising at least one additional sensor for detection and valuation of at least one of the parameters of engine load, air/fuel ratio, manifold pressure, engine speed, fuel heating value or gas composition and transmittal of a signal to said microprocessor for enhancement of control by said microprocessor of said actuator.

37. Apparatus for control of exhaust emissions of a gas fueled internal combustion engine, said engine having an air intake, an intake conduit for gaseous fuel and an exhaust conduit for gaseous combustion products, which apparatus comprises:

a housing having a fuel flow conduit therethrough, said fuel flow conduit comprising means for incorporation in said intake conduit with said conduits forming a continuous flow path for all fuel flowing to said engine and said fuel flow conduit providing full fuel authority whereby all fuel supplied from a fuel source to said intake conduit passes through said fuel flow conduit;

said fuel flow conduit having a fuel flow orifice and a valve seat at said orifice;

a gas flow metering valve movably mounted in said housing for incremental movement towards and away from said valve seat and thereby controlling the size of said fuel flow orifice;

a programmable microprocessor mounted in said housing for controlling operation of said valve;

a pressure sensor in said housing having electrical signal communication with said microprocessor;

an actuator in said housing having electrical signal communication with said microprocessor and directly controlling said incremental movement of said gas flow control valve in response to signals received from said microprocessor;

a sensor disposed in said exhaust conduit for sensing of a gaseous component of said exhaust and having electrical signal communication with said microprocessor; and an electrical power supply to said microprocessor, pressure transducer and actuator;

whereby in response to a signal received from said sensor or from said pressure sensor indicative of engine operating conditions in which an unacceptable level of exhaust emissions exists, said microprocessor controls said actuator to move said gas flow metering valve incrementally towards or away from said valve seat to vary the size of said fuel flow orifice in order to change outlet pressure and in turn flow rate of said fuel to said engine to create a air/fuel ratio in combustion chambers of said engine in a manner to restore emissions content level in said exhaust gas to an acceptable level of such exhaust emissions.

* * * * *